United States Patent Office 2,936,984
Patented May 17, 1960

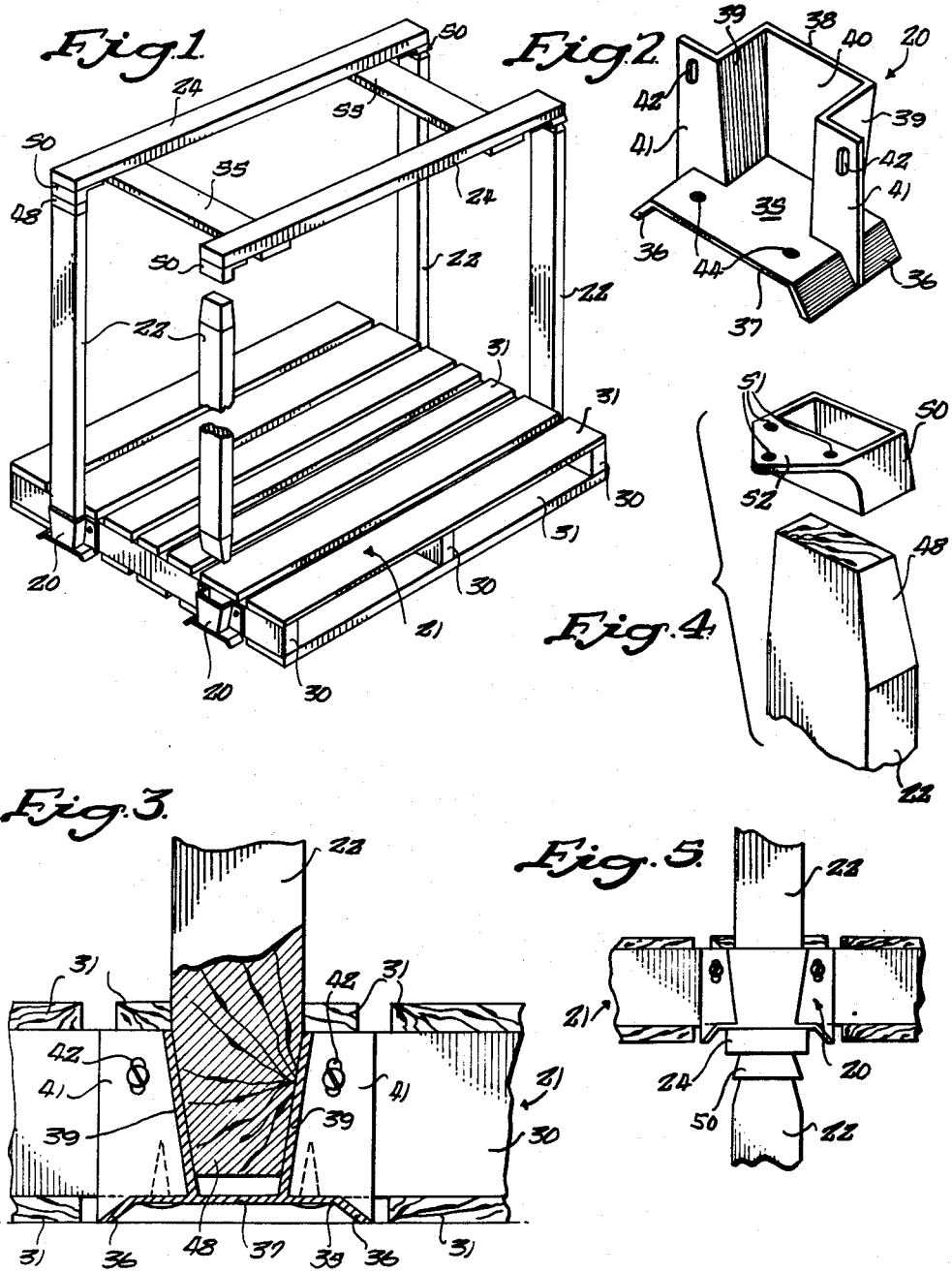

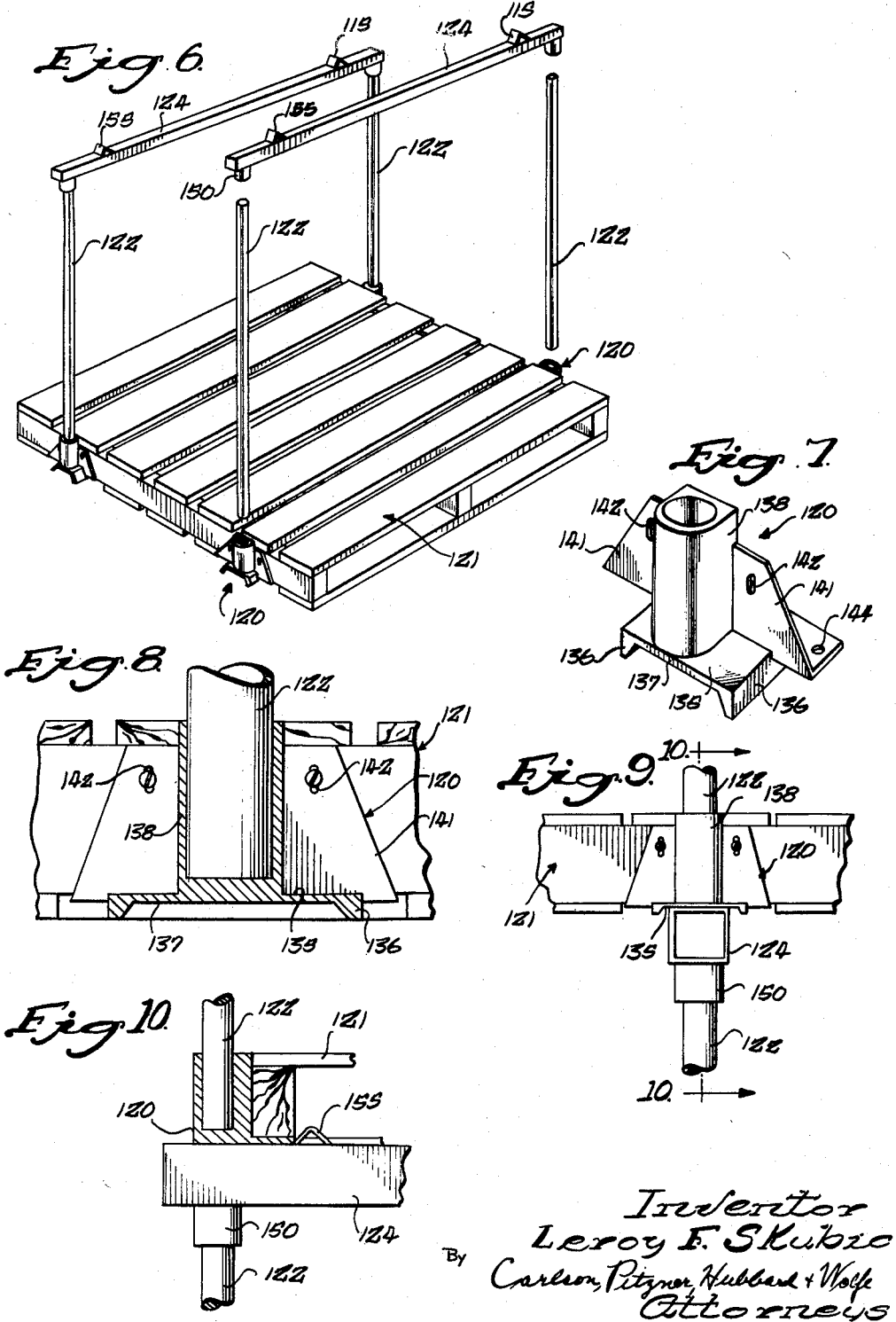

2,936,984

PALLET TIERING AND SUPPORTING MEANS

Leroy F. Skubic, Beverly Shores, Ind., assignor to The Paltier Corporation, Michigan City, Ind., a corporation of Illinois Application June 9, 1955, Serial No. 514,156

3 Claims. (Cl. 248—120)

The present invention relates to pallets for handling and storing materials and, more particularly, to improved socket fittings, adapted to be secured to the pallets, for receiving therein supporting posts and for aligning the pallets when they are placed on such posts in tiers.

Pallets of the type to which this invention relates are commonly used in warehauses and storage areas for stacking loads of merchandise and other articles on successive levels. In accordance with this invention, each pallet is provided with means for receiving a plurality of marginal posts which support corresponding pallets in vertical stacks at predetermined heights above the storage floor.

In the material handling field it has been the usual case to mount the tiering socket fittings directly on the pallet's surface. Socket fittings secured to the pallet in this manner have been found to have a twofold disadvantage: First, they occupy needed storage space and interfere with the loading of the pallet; second, they depend for their strength upon the stability and rigidity of the pallet construction. If the pallet is loosely constructed, it may shift laterally and collapse under the added weight of the pallets above it, causing the entire stack to collapse and spill its carefully stacked contents.

It is an object of the present invention to provide a pallet tiering socket fitting which may be secured to a peripheral edge of a pallet so that the upper edge of the socket fitting is flush with the pallet surface.

Another object is to provide a socket fitting of the foregoing type which is suitable for receiving posts used for supporting successively tiered pallets and which supports the posts directly on the storage floor.

Still another object is to provide a socket fitting having the above characteristics and which, when mounted on the pallet, makes the tiered pallet self-aligning with respect to the lower pallet above which it is positioned.

A further object is to provide a pallet tiering socket fitting, of the type set forth above, and having supporting legs which provide a sufficient clearance between the fitting and the floor to permit the use of a hand pallet truck therewith.

Still a further object is to provide a pallet tiering socket fitting having the characteristics set forth above, and which is suitable for use with common structural material, such as wooden or metal posts.

Other objects and advantages will become apparent to those skilled in the art as the following detailed description proceeds, taken in connection with the accompanying drawings wherein:

Figure 1 is a perspective view of a pallet having tiering means secured thereto which are illustrative of the present invention.

Fig. 2 is a perspective view of a socket fitting illustrative of the present invention.

Fig. 3 is a partially cutaway elevation view showing the socket fitting with a wooden post supported therein.

Fig. 4 is an exploded perspective view of the upper end of the support post and a cooperating stringer socket.

Fig. 5 is a partial elevation view showing a tiered pallet positioned on a supporting post and stringer.

Fig. 6 is a perspective view of a pallet having a modified form of tiering means illustrative of the present invention secured thereto.

Fig. 7 is a perspective view of a modified form of pallet tiering socket fitting embodying the present invention.

Fig. 8 is a partially cutaway elevation view showing the modified socket fitting with a metal post supported therein.

Fig. 9 is a partial elevation view showing a tiered pallet positioned on a metal supporting post and stringer.

Fig. 10 is a section view taken on line 10—10 of Fig. 9.

While the invention is susceptible of various modifications and alternative constructions, certain preferred embodiments have been shown in the drawings and will be described below in detail. It should be understood, however, that there is no intention to limit the invention to the specific forms disclosed but, on the contrary, the intention is to cover all modifications and alternative constructions falling within the spirit and scope of the invention as expressed in the appended claims.

In accordance with the present invention, socket fittings 20 are provided which are suitable for mounting on opposite sides of a pallet 21 for receiving therein vertical support posts 22. The posts 22 in turn support cross-stringers 24 having downwardly facing sockets 25 mounted thereon which fit over the upper ends of the posts 22. Similarly constructed pallet structures are then placed on top of the base pallet 21 in a vertical tier.

Referring now to Fig. 1, the pallet designated generally by the numeral 21 comprises spaced parallel wood stringers 30 with top and bottom slats 31 disposed in crosswise relation and secured to the stringers 30 by means of nails, screws or the like. For convenience in describing the invention, the two slatted sides of the pallet are referred to hereinafter as the top and bottom, respectively, and the extremities of the pallet between which the stringers 30 extend are referred to as the pallet ends, and the extremities between which the slats 31 extend are referred to as the sides. It should be noted that the second slat from each end on the bottom of the pallet is omitted to provide a wheel opening so that the pallet can be used with a hand pallet truck.

When wooden posts are to be used for tiering the pallets, novel socket fittings 20, as shown in Figs. 1 and 2, are attached to the sides and bottom surfaces of the stringers 30 by means of nails, screws or the like, and at a point near the ends of the stringer directly in line with the wheel openings on the bottom of the pallet. The socket fitting 20, embodying the novel features of the invention, comprises a channel shaped base 35, the walls 36 of which project downwardly and slightly outwardly from the center portion 37, and an upstanding tapered channel section or socket portion 38 mounted on said channel base 35. The walls 39 and center portion 40 of the upstanding tapered channel section slope upwardly and outwardly from the base, the center portion 40 being disposed perpendicular to the depending walls 36 of the base channel 35. Mounting flanges 41 are provided on the socket walls 39 and project outwardly therefrom parallel to the upstanding center portion 40 and perpendicular to the base channel 35.

In order to secure the socket fitting 20 to the pallet 21 the base channel extends beyond the upstanding socket portion 38 so that it may be inserted beneath the pallet and in the wheel opening between the bottom slats 31. When the socket fitting is so positioned adjacent the pallet, the flanges are flat against the side surface of the stringer, which surface then serves as one side of the socket 38 for receiving a post 22. Holes 42 and 44 are provided in the flanges and the center portion 37 of the base channel, respectively, to permit screws or the like to be inserted therethrough in order to secure the fitting 20 to the pallet.

The posts 22, the ends 48 of which are tapered to correspond to the tapered sockets, are securely inserted in the sockets between the upstanding tapered channel 38 and the stringers 31. The downwardly projecting walls 36 of the base channel 35 serve as legs to support the socket fitting, and thus the posts, directly on the floor on which the pallet rests (Fig. 3). Tapered ends 48 are provided on the posts, as shown in Fig. 3, in order to provide a secure fit and to prevent the posts from sticking in the sockets when it is necessary to remove them for storing the pallets or for replacing the posts.

In order to secure the cross-stringers 24 to the upper ends of the posts 22, tapered sockets 50 are provided, as shown in Fig. 4, which fit over the tapered ends 48. These sockets are secured to the underside of the ends of the cross-stringers 24 by means of screws or the like inserted through holes 51 in a mounting flange 52 which projects from the socket. Tie bars 55 are secured between the cross-stringers to prevent them from moving apart when a pallet is placed thereon.

In accordance with another aspect of this invention, referring now to Fig. 5, the socket fittings 20, which are secured to the underside of the pallet provide a guide for aligning the pallets when they are positioned in vertical tiers, thereby preventing them from tipping. This aligning feature of the socket fitting results from the depending, outwardly sloping walls 36 on the base 35, which act as guides when the pallet is placed on the post supported cross-stringers 24. The pallet is positioned on the support with the center portion 37 of the fitting base 35 resting directly on the cross-stringers 24 and the guide walls 36 on either side thereof.

As a further aspect of this invention it can be seen that, when the pallets are tiered, the socket fittings and posts support the entire weight of the pallets directly on the floor and independently of the intermediate pallets. The entire weight of the tiered pallets is transmitted through the posts, stringers and socket fittings, and each pallet supports only the weight of the merchandise or goods placed on it.

Turning now to Fig. 6, there is shown a modified form of this invention for use with metal tubular posts and metal cross-stringers. In this modification, a socket fitting 120 is provided which is suitable for mounting on the sides of the pallet 121 and for receiving therein a tubular post 122. Cross-stringers 124 are adapted to be mounted at the tops of the posts 122 in order to support additional pallets above it in vertical tiers.

The socket fitting 120 is provided with a channel shaped base 135, as shown in Fig. 7, which is adapted to fit underneath the pallet. This channel is provided with sloping guide legs 136 and has mounted on its horizontal center portion a tubular socket member 138 adapted to receive the posts 122. Mounting flanges 140 project from the socket member 138 perpendicular to the channel 135 so that the socket fitting may be secured to the side of the pallet. For this purpose, holes 142 and 144 are provided in the flanges 140 and center portion of the channel member 135, respectively, in order to receive fastening screws or the like (Fig. 8). When the socket fitting 120 is secured to the pallet 121, its legs 136 rest on the storage floor and the socket member 138, which receives the post 122, does not project above the top of the pallet. By virtue of the channel shaped base 135, a clearance is provided between the socket fitting and the floor to permit the use with a hand truck.

In order to securely mount the cross-stringers 124 on the posts 122, the cross-stringers are provided with depending tubular sockets 150 adapted to fit over the upper ends of the posts. When the posts and cross-stringers are in place, a second pallet having similarly attached socket fittings may be placed on top thereof. The channel base and the outwardly sloping legs thereon provide a self-aligning feature for successively tiered pallets, thereby preventing the horizontal displacement of tiered pallets from one another. As an added aligning feature the cross-stringers 124 are provided, intermediate their ends, with upstanding angle guides 155 so spaced from the ends of the cross-stringers as to be engaged by the inner edge portions of the sockets 120, as shown in Fig. 10. When a pallet is placed above a preceding pallet which is provided with posts 122 and cross-stringers 124 having the guides 155, a two-way alignment is assured since the channel base of the socket fittings prevents sliding of the tiered pallet in a direction perpendicular to the cross-stringers while the angle guides 155 on the cross-stringers prevent sliding of the pallet parallel to the cross-stringers, the net result being to align the tiered pallets vertically with respect to each other.

I claim:

1. A socket fitting for use on a pallet to be positioned in a load supporting structure including a plurality of vertically tiered pallets, each pallet having a plurality of spaced longitudinal stringers, and a plurality of spaced top slats and bottom slats secured transversely on the stringers with the bottom slats being spaced apart so as to define two spaced openings on each side of the pallet, each opening having a width of about one slat, said load supporting structure including two pairs of vertical posts mounted on a base pallet and a pair of crossbars supported on and extending between the upper ends of respective pairs of vertical posts for supporting a vertically tiered pallet in the structure, each of said pallets having a socket fitting attached to the stringers thereof in juxtaposition with each of said bottom openings, the fittings on the base pallet receiving and supporting the lower ends of corresponding ones of said posts, each of said socket fittings comprising walls forming a post receiving socket, mounting flanges extending from opposite walls of each socket parallel to the adjacent stringer and including apertures receiving fasteners securing the fitting to the stringer, a base member perpendicular to said mounting flanges extending within the adjacent pallet bottom opening beneath the pallet and including apertures receiving fasteners securing said base member to the stringer bottom, said base member defining the bottom of said socket and having a pair of spaced downwardly and outwardly inclined legs for guiding engagement with opposite edges of a crossbar when the pallet is tiered thereon so that the socket is alined directly above the crossbar.

2. The socket fitting defined in claim 1 wherein said socket forming walls comprise a pair of opposite spaced walls joined by a mutually perpendicular wall, all three of said walls converging downwardly and inwardly to define a tapering socket for receiving a rectangular post.

3. The socket fitting defined in claim 1 wherein said socket forming walls define a cylindrical socket for receiving a tubular post.

References Cited in the file of this patent

UNITED STATES PATENTS

| 351,246 | Bothe | Oct. 19, 1886 |
|---|---|---|
| 564,740 | Dietz | July 28, 1896 |
| 893,165 | Haley | July 14, 1908 |
| 1,944,845 | Rickwood | Jan. 23, 1934 |
| 2,579,685 | Loose | Dec. 25, 1951 |
| 2,676,776 | Townson | Apr. 27, 1954 |
| 2,700,520 | Skubic | Jan. 25, 1955 |
| 2,728,544 | Ayre et al. | Dec. 27, 1955 |

FOREIGN PATENTS

| 705,191 | Great Britain | Mar. 10, 1954 |